(12) United States Patent
Huang et al.

(10) Patent No.: US 12,472,047 B2
(45) Date of Patent: Nov. 18, 2025

(54) SHELL-SHAPED DENTAL APPLIANCE CAPABLE OF PREVENTING DENTAL CARIES AND METHOD OF FABRICATING THE SAME

(71) Applicant: Wuxi EA Biotechnology Limited, Jiangsu (CN)

(72) Inventors: Lei Huang, Shanghai (CN); Shida Lv, Shanghai (CN)

(73) Assignee: WUXI EA BIOTECHNOLOGY LIMITED, Jiangsu (CN)

( * ) Notice: Subject to any disclaimer, the term of this patent is extended or adjusted under 35 U.S.C. 154(b) by 299 days.

(21) Appl. No.: 17/923,800

(22) PCT Filed: Mar. 12, 2021

(86) PCT No.: PCT/CN2021/080477
§ 371 (c)(1),
(2) Date: Nov. 7, 2022

(87) PCT Pub. No.: WO2021/223514
PCT Pub. Date: Nov. 11, 2021

(65) Prior Publication Data
US 2023/0200962 A1    Jun. 29, 2023

(30) Foreign Application Priority Data

May 8, 2020    (CN) .......................... 202010381338.1

(51) Int. Cl.
A61C 19/06        (2006.01)
(52) U.S. Cl.
CPC ................................. *A61C 19/063* (2013.01)

(58) Field of Classification Search
CPC .................................................... A61C 19/063
See application file for complete search history.

(56) References Cited

U.S. PATENT DOCUMENTS 5,415,544 A * 5/1995 Oxman .................. C08L 67/04
433/48
2003/0187092 A1* 10/2003 Fujiwara .................. A61K 6/30
523/118

(Continued)

FOREIGN PATENT DOCUMENTS

CA        2220857 A1    7/1999
CN      105232165 A    1/2006

(Continued)

OTHER PUBLICATIONS

Science Direct (A platform that provides access to scientific, technical, and health literature) [online]. [retrieved Nov. 19, 2024-]. Retrieved from the Internet: https://www.sciencedirect.com/topics/medicine-and-dentistry/fluoride-ion (Year: 2010).*

(Continued)

*Primary Examiner* — Eric J Rosen
*Assistant Examiner* — Luis Ruiz Martin
(74) *Attorney, Agent, or Firm* — MH2 Technology Law Group LLP

(57) ABSTRACT

A shell-shaped dental appliance includes: a body which is an integral shell and forms a cavity for receiving teeth; and an anti-caries film which has a certain thickness, and is formed on at least a partial area of an inner surface of the body, and is able to react with saliva to release fluoride ions.

12 Claims, 2 Drawing Sheets

(56) References Cited

U.S. PATENT DOCUMENTS

| | | | | |
|---|---|---|---|---|
| 2003/0205234 | A1* | 11/2003 | Bardach | A61J 7/0053 128/861 |
| 2003/0211440 | A1 | 11/2003 | Kuo et al. | |
| 2004/0241619 | A1* | 12/2004 | Allred | A61Q 11/00 433/215 |
| 2015/0342838 | A1* | 12/2015 | Hara | A61K 6/20 523/120 |
| 2016/0068554 | A1* | 3/2016 | Rusin | A61K 8/11 558/114 |
| 2017/0128346 | A1 | 5/2017 | Dong et al. | |
| 2018/0008389 | A1* | 1/2018 | Allen | A61C 19/063 |

FOREIGN PATENT DOCUMENTS

| | | |
|---|---|---|
| CN | 101005824 A | 7/2007 |
| CN | 105496797 A | 4/2016 |
| CN | 107049799 A | 8/2017 |
| CN | 108348444 A | 7/2018 |
| CN | 109259874 A | 1/2019 |
| CN | 109381266 A | 2/2019 |
| EP | 1318761 B1 | 1/2011 |
| EP | 3725292 A1 * | 10/2020 |

OTHER PUBLICATIONS

Jan. 19, 2023 First Office Action issued in Chinese Patent Application No. CN202010381338.1.

Sep. 6, 2023 Second Office Action issued in Chinese Patent Application No. CN202010381338.1.

Oct. 31, 2023 Rejection issued in Chinese Patent Application No. CN202010381338.1.

Jun. 26, 2024 Notice of reexamination issued in Chinese Patent Application No. CN202010381338.1.

May 14, 2024 Extended Search Report issued in European Patent Application No. EP21800662.5.

* cited by examiner

100 a body of a shell-shaped dental appliance is obtained — 101 an anti-caries film is formed on at least a partial area of the inner surface of the body — 103

A-A

SHELL-SHAPED DENTAL APPLIANCE CAPABLE OF PREVENTING DENTAL CARIES AND METHOD OF FABRICATING THE SAME

FIELD OF THE APPLICATION

The present application generally relates to a shell-shaped dental appliance capable of preventing dental caries and a method of fabricating the same.

BACKGROUND

Caries is one of common dental diseases. The investigation of the national health organization shows that the dental caries occurrence rate of Chinese children's deciduous teeth reaches 70%, the dental caries occurrence rate of 12-year-old children's permanent teeth is approximately 50%, and the dental caries occurrence rate of adults reaches 88%. Therefore, it is of great importance to prevent caries.

Generally, there are mainly two types of bacteria that cause caries: one is acidogenic bacteria (e.g. *Streptococcus mutans, actinomyces* and *lactobacillus*) which enables food residue (e.g. carbohydrate) to decompose to produce acid, thereby causing demineralization of inorganic matter of teeth; the other type of bacteria (e.g. Gram-positive cocci) destroys organic matter, and form carious cavities after long-term action.

Caries can be prevented. At present, fluoride is an internationally recognized effective anti-caries substance. The fluoride is able to inhibit reproduction of cariogenic bacteria in oral cavity and suppress acid production of bacteria, meanwhile reduce solubility of enamel on tooth surface, and promote remineralization of demineralized enamel. Intake of a proper amount of fluoride during teeth development makes cusps smooth and fissures shallow. Such change on geometry makes it easier to keep teeth clean and enhances resistance to caries.

At present, there are mainly three types of anti-caries techniques using fluoride as follows:

Fluoride toothpaste is the most common anti-caries technique at present. An inorganic fluoride such as sodium fluoride is added into toothpaste so that certain anti-caries effect is achieved conveniently and quickly while cleaning teeth. However, toothpaste stays and acts only for a short period of time in oral cavity.

Fluoride foam is an internationally recognized quick and effective anti-caries technique. The anti-caries effect is achieved by applying highly concentrated fluoride foam on teeth and let it act for three minutes. At present, fluoride foam is substantially only used to prevent caries for pre-schoolers.

Fluoride varnish is a technique of applying varnish containing highly concentrated fluoride ions on tooth surface to prevent caries. Typical representatives of fluoride varnish are Duraphat of Colgate and White Varnish of 3M. It is required that fluoride varnish must be applied by a dental professional. At present, the technique is only performed clinically, and consumers cannot use fluoride varnish by themselves.

The Inventors of the present application believe that in view of the importance of caries prevention, it is necessary to provide different anti-caries means.

SUMMARY

In one aspect, the present application provides a shell-shaped dental appliance, which includes: a body which is a one piece shell and forms a cavity for receiving teeth; and an anti-caries film which has a certain thickness, is formed on at least a partial area of an inner surface of the body, and is able to react with saliva to release fluoride ions.

In some embodiments, the thickness of the anti-caries film may be less than 25 μm.

In some embodiments, the body may be made of a polymer material.

In some embodiments, the anti-caries film contains a film-forming agent and a fluorine-containing substance.

In some embodiments, the fluorine-containing substance may be a fluorine-containing organic compound that is able to be hydrolyzed to release fluoride ions.

In some embodiments, the fluorine-containing organic compound may be a fluorine-containing silane.

In some embodiments, the weight content of fluorine in the anti-caries film may be 600-11200 ppm.

In some embodiments, the film-forming agent may be a polymer capable of forming a continuous film.

In some embodiments, the film-forming agent may be one of the following: aromatic isocyanate, acrylate, and a mixture thereof.

In some embodiments, the anti-caries film may further contain an aromatic.

In some embodiments, the geometry of at least a part of the cavity may match a corresponding part of a patient's dentition.

In another aspect, the present application provides a method for fabricating a shell-shaped dental appliance, comprising: obtaining a body of a shell-shaped dental appliance which body is a one-piece shell and forms a cavity for receiving teeth; and forming an anti-caries film on at least a partial area of an inner surface of the body, wherein the anti-caries film is able to react with saliva to release fluoride ions.

In some embodiments, the geometry of at least a part of the cavity may match a corresponding part of a patient's dentition.

In some embodiments, the body may be made of a polymer material.

In some embodiments, the method for fabricating a shell-shaped dental appliance may further comprise: applying an anti-caries solution on at least a partial area of the inner surface of the body; and letting the anti-caries solution applied on the inner surface of the body to cure to form the anti-caries film.

In some embodiments, an amount of the coated anti-caries solution may be controlled such that the thickness of the anti-caries film is less than 25 μm.

In some embodiments, the anti-caries solution may contain an organic solvent, a film-forming agent, and a fluorine-containing substance.

In some embodiments, the organic solvent in the anti-caries solution applied on the inner surface of the body may gradually volatilize, so that the anti-caries film almost does not contain the organic solvent.

In some embodiments, the film-forming agent may be a polymer capable of forming a continuous film.

In some embodiments, the film-forming agent may be one of the following: aromatic isocyanate, acrylate, and a mixture thereof.

In some embodiments, the fluorine-containing substance may be a fluorine-containing organic compound that is able to be hydrolyzed to release fluoride ions.

In some embodiments, the fluorine-containing organic compound may be fluorine-containing silane.

In some embodiments, the content of the fluorine-containing substance in the anti-caries solution may be such that the weight content of fluorine in the anti-caries film is 600-11200 ppm.

BRIEF DESCRIPTION OF THE DRAWINGS

The above and other features of the present application will be further illustrated below with reference to figures and their detailed description. It should be appreciated that these figures only show several exemplary embodiments according to the present application, so they should not be construed as limiting the protection scope of the present application. Unless otherwise specified, the figures are not necessarily drawn to scale, and similar reference numbers therein denote similar components.

DETAILED DESCRIPTION OF ILLUSTRATED EMBODIMENTS

In the following detailed description, reference is made to the accompanying drawings, which form a part thereof. Exemplary embodiments in the detailed description and figures are only intended for illustration purpose and not meant to be limiting. Inspired by the present application, those skilled in the art can understand that other embodiments may be utilized and other changes may be made, without departing from the spirit or scope of the present application. It will be readily understood that aspects of the present application described and illustrated herein can be arranged, replaced, combined, separated and designed in a wide variety of different configurations, all of which are explicitly contemplated and make part of the present application.

Shell-shaped dental appliances such as shell-shaped tooth repositioners, retainers and snore stoppers made of polymer materials become more and more popular due to their advantages on aesthetic appearance, convenience and hygiene.

Usually, a shell-shaped dental appliance is worn for long hours daily. For shell-shaped tooth repositioner, a patient is required to wear it all day long except during eating and tooth brushing, generally, for no less than 22 hours daily. Furthermore, an orthodontic treatment might take up to 1-3 years. For shell-shaped retainer and snore stopper, a patient needs to wear it during sleep, and might need to use it in lifetime.

A shell-shaped dental appliance isolates teeth from the oral cavity environment for a long term, keeps the teeth in a relatively closed anoxic environment, and hinders the normal contact of saliva with the teeth (saliva is critical for oral hygiene, it washes away bacteria from the oral cavity and maintains microbial balance, and enzymes in saliva decompose food residues). Therefore, wearing a shell-shaped dental appliance can accelerate reproduction of anaerobic bacteria on surfaces of teeth, resulting in dental plaque, and then causing many problems such as caries, yellow teeth, periodontal disease and halitosis.

The Inventors of the present application realize the necessity of providing different anti-caries means on the one hand, and realize the above problems of shell-shaped dental appliance on the other hand. Motivated by this, the Inventors developed a shell-shaped dental appliance with anti-caries effect and a method of fabricating the same.

Figure 1:
FIG. 1 schematically illustrates a flow chart of a method for fabricating a shell-shaped dental appliance according to one embodiment of the present application.

Referring to FIG. 1, it schematically illustrates a flow chart of a method 100 of fabricating a shell-shaped dental appliance according to one embodiment of the present application;

In 101, a body of a shell-shaped dental appliance is obtained.

The body of the shell-shaped dental appliance is made of a polymer material, which body is an integral shell and forms a cavity for receiving teeth, wherein the geometry of at least a part of the cavity substantially matches a corresponding part of a patient's tooth arrangement.

At present, the most commonly used method for fabricating a body of a shell-shaped dental appliance is thermoforming technique. The basic process of the method includes thermoforming a heated polymer sheet material on a tooth model, trimming and polishing the thermoformed negative model after cooling to obtain the body of the shell-shaped dental appliance.

In one embodiment, the body of the shell-shaped dental appliance may be constructed of a single layer of material. In another embodiment, the body of the shell-shaped dental appliance may be constructed of two or more layers of materials.

In one embodiment, the cavity of the body of the shell-shaped dental appliance is for receiving an entire dentition. In a further embodiment, the cavity of the body of the shell-shaped dental appliance is for receiving a part of a dentition only (a plurality of teeth).

In one embodiment, the shell-shaped dental appliance may be a shell-shaped orthodontic repositioner for repositioning a patient's teeth from a current first tooth arrangement to a second tooth arrangement. In this example, the model of teeth for fabricating the body of the shell-shaped dental appliance may substantially match the second tooth arrangement of the patient's teeth, or slightly deviate towards the repositioning direction so that the shell-shaped dental appliance is able to reposition the patient's teeth to the second tooth arrangement.

In a further embodiment, the body of the shell-shaped dental appliance may be fabricated using a 3D printing technology. In yet another embodiment, the body of the shell-shaped dental appliance may be fabricated by cutting a blank using a numerical control machine.

In 103, an anti-caries film is formed on at least a partial area of an inner surface of the body of the shell-shaped dental appliance.

The anti-caries film is attached to the inner surface of the shell-shaped dental appliance body and has a certain thickness.

In one embodiment, the anti-caries film may be formed only on a selected area of the inner surface of the body of the shell-shaped dental appliance, and the area may be selected according to specific conditions and needs. In yet another embodiment, the anti-caries film may be formed on the entire inner surface of the body of the shell-shaped dental appliance.

In one embodiment, an anti-caries solution may be applied on the inner surface of the body of the shell-shaped dental appliance, and the anti-caries film is formed after the solution cures.

In one embodiment, the anti-caries solution may comprise an organic solvent, a film-forming agent, and a fluorine-containing substance.

The organic solvent is used to dissolve the film-forming agent and the fluorine-containing substance and mix them uniformly. Examples of the organic solvent comprise but are not limited to: ethyl acetate, butyl acetate, isoamyl acetate, isoamyl propionate, isoamyl butyrate etc. and mixtures thereof. During the formation of the anti-caries film, the organic solvent in the anti-caries solution is gradually volatilized, and the anti-caries film almost does not contain the organic solvent. Therefore, while wearing the shell-shaped dental appliance of the present application, the patient will not feel uncomfortable because of the organic solvent.

The film-forming agent is a polymer capable of forming a continuous film, and its examples comprise but are not limited to aromatic isocyanate, acrylate, and a mixture thereof. It is understood that aromatic isocyanate and acrylate each refer to a class of substances, and may comprise different specific substances. Therefore, the film-forming agent may be a mixture of two or more types of aromatic isocyanate, a mixture of two or more types of acrylate, or a mixture of one or more types of aromatic isocyanate and one or more types of acrylate.

On the one hand, the aromatic isocyanate and acrylate film-forming agent is colorless and transparent, and is able to form a colorless and transparent film, which keeps the appearance of a shell-shaped dental appliance unchanged. In the case where the color of the shell-shaped dental appliance needs to be changed, a colorant may be mixed into the anti-caries solution, so that the part of the shell-shaped dental appliance covered with the anti-caries film exhibits a desired color. On the other hand, viscosities of aromatic isocyanate and acrylate film-forming agents are low, so that the anti-caries solution has good leveling performance and it is easy to apply it on a surface evenly.

Inspired by the present application, it is understood that the physical properties (e.g. hardness and adhesive property) of the anti-caries film mainly depend on the film-forming agent, and the film-forming agent may be selected according to specific conditions and needs.

The fluorine-containing substance can react with saliva to generate fluoride ions to achieve anti-caries effect. In one embodiment, the fluorine-containing substance may be a fluorine-containing organic compound that can be hydrolyzed to release fluoride ions. In one embodiment, the fluorine-containing substance may be a fluorine-containing organosilane whose structural formula is R—[SiF$_m$(OH)$_{3-m}$]$_n$, where m is in a range of 1~3, and n is in a range of 1~4.

In one embodiment, in order to better wearing experience, the anti-caries solution may further comprise an aromatic. Examples of the aromatic include but are not limited to: menthol, coolants, fruit flavoring essences etc.

In one embodiment, the weight content of the fluorine-containing substance is 0.5%-10%, the weight content of the film-forming agent is 5%-25%, the weight content of the organic solvent is 75%-90%, and the weight content of the fragrance is 0.05%~0.1%.

In one embodiment, the weight content of fluorine in the anti-caries film is greater than or equal to 600 ppm. In yet another embodiment, the weight content of fluorine in the anti-caries film may be 600-11200 ppm.

The anti-caries solution may be applied by spraying, dipping, manual spreading or the like.

Figure 2:
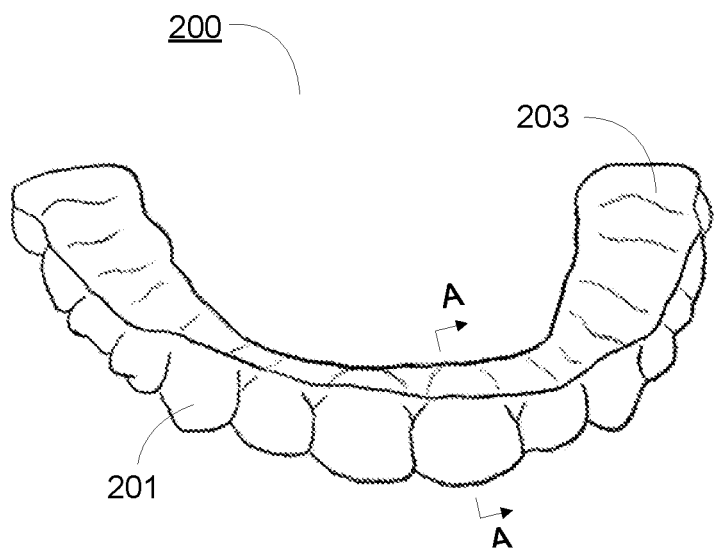
FIG. 2 schematically illustrates a shell-shaped dental appliance according to one embodiment of the present application.
Figure 3:
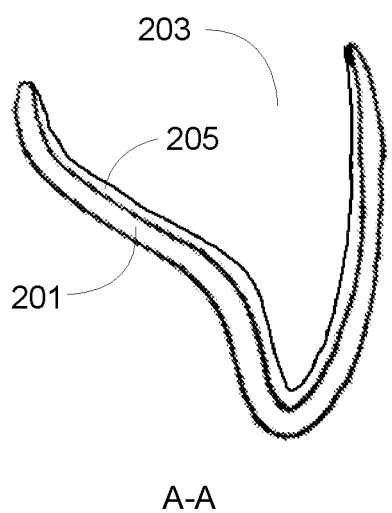
FIG. 3 schematically illustrates a cross-sectional view along line A-A of the shell-shaped dental appliance shown in FIG. 2.

Please refer to FIG. 2 and FIG. 3, wherein FIG. 2 schematically illustrates a shell-shaped dental appliance 200 according to one embodiment of the present application, and FIG. 3 schematically illustrates a cross-sectional view taken along line A-A of the shell-shaped dental appliance 200 shown in FIG. 2.

The shell-shaped dental appliance 200 comprises a body 201 that is an integral shell and forms a cavity 203 for receiving teeth. An anti-caries film 205 is formed on the inner surface of the body 201 (i.e. the surface of the cavity 203).

In one embodiment, the thickness of the anti-caries film 205 may be determined depending on specific needs and conditions. For example, for a shell-shaped tooth repositioner fabricated using thermoforming technique, if tolerance of error of physical model of teeth is ±100 μm, the thickness of the anti-caries film 205 may be controlled to be below 50 μm (micrometer), or even below 25 μm, so that the anti-caries film 205 basically does not affect the orthodontic performance of the shell-shaped tooth repositioner.

The formation of the anti-caries film will be described in detail in the following two specific examples.

Example 1

The composition of the anti-caries solution is as follows:
a fluorine-containing organic compound (a fluorine-containing organic compound that is more soluble in organic solvent): 1% fluorine-containing organosilane with a fluorine content of about 0.1%;
a film-forming agent: 11% aromatic isocyanate film-forming agent;
an organic solvent: 62.9% ethyl acetate and 25% isoamyl propionate;
an aromatic: 0.1% coolant.

The anti-caries solution is evenly applied on the inner surface of the shell-shaped tooth repositioner with a brush and lets it cure at a room temperature.

Wherein, the structural formula of fluorine-containing organosilane is as follows:

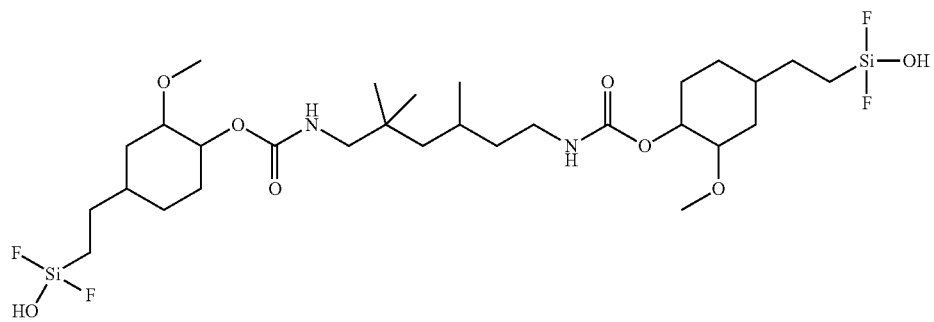 [SMILES: COC1CC(CC[Si](O)(F)F)CCC1OC(=O)NCCC(C)CC(C)(C)CNC(=O)OC1CCC(CC[Si](O)(F)F)CC1OC]

In this example, the film-forming agent is toluene diisocyanate-trimethylolpropane-diethylene glycol adduct, and it is cured by reacting with water vapor in the air.

In this example, the adhesion between the anti-caries film and the shell-shaped tooth repositioner is strong, and it reaches the highest grade ISO 2409:2013-2a-0 in a cross-cut test.

The pencil hardness level of the anti-caries film reaches H level.

The anti-caries film has a fluoride release rate greater than 500 mg/kg, and has a good anti-caries effect.

Example 2

The composition of the anti-caries solution is as follows:
a fluorine-containing organic compound: 1% fluorine-containing organosilane with a fluorine content about 0.1%;
a film-forming agent: 11% aromatic isocyanate;
an organic solvent: 87.9% butyl acetate;
an aromatic: 0.1% lemon essence.

The anti-caries solution is evenly applied on the inner surface of the shell-shaped tooth repositioner with a brush and lets it cure at a room temperature.

Wherein, the structural formula of fluorine-containing organosilane is as follows:

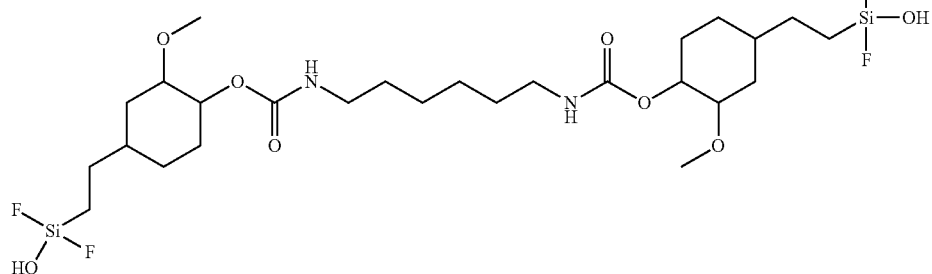

In this example, the film-forming agent is a toluene diisocyanate-trimethylolpropane prepolymer and it is cured by reacting with water vapor in the air.

In this example, the adhesion between the anti-caries film and the shell-shaped tooth repositioner is strong, and it reaches the highest grade ISO 2409:2013-2a-0 in a cross-cut test.

The pencil hardness level of the anti-caries film reaches H level.

The anti-caries film has a fluoride release rate greater than 500 mg/kg, and has a good anti-caries effect.

It is understood that as long as a sufficient amount of fluoride ions is released, a sufficient anti-caries effect can be achieved. The anti-caries effect of the anti-caries films of the above two examples last for 3 to 6 months.

It is understood that the shell-shaped dental appliance of the present application not only solves the bacteria inhibition-related problem of traditional shell-shaped dental appliances to a certain extent, but also provides a new anti-caries means, and furthermore, the anti-caries means does not require doctors and patients to perform additional operations and is very convenient.

While various aspects and embodiments have been disclosed herein, other aspects and embodiments will be apparent to those skilled in the art, inspired by the present application. The various aspects and embodiments disclosed herein are for illustration only and are not intended to be limiting, and the scope and spirit of the present application shall be defined by the following claims.

Likewise, the various diagrams may depict exemplary architectures or other configurations of the disclosed methods and systems, which are helpful for understanding the features and functions that can be included in the disclosed methods and systems. The claimed invention is not restricted to the illustrated exemplary architectures or configurations, and desired features can be achieved using a variety of alternative architectures and configurations. Additionally, with regard to flow diagrams, functional descriptions and method claims, the order in which the blocks are presented herein shall not mandate that various embodiments of the functions shall be implemented in the same order unless otherwise the context specifies.

Unless otherwise specifically specified, terms and phrases used herein are generally intended as "open" terms instead of limiting. In some embodiments, use of phrases such as "one or more", "at least" and "but not limited to" should not be construed to imply that the parts of the present application that do not use similar phrases intend to be limiting.

We claim:
1. A shell-shaped dental appliance, comprising:
a body which is an integral shell and forms a cavity for receiving teeth; and
an anti-caries film which has a certain thickness, is formed on at least a partial area of an inner surface of the body, and is able to react with saliva to release fluoride ions; wherein the anti-caries film contains a film-forming agent and a fluorine-containing substance, the film-forming agent is aromatic isocyanate, wherein the fluorine-containing substance is a fluorine-containing organosilane whose structural formula is

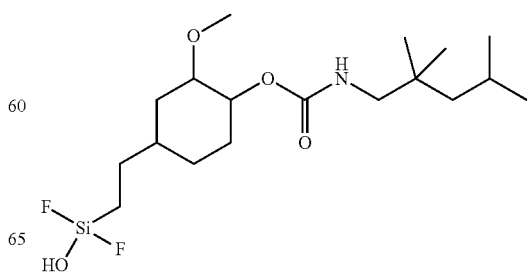

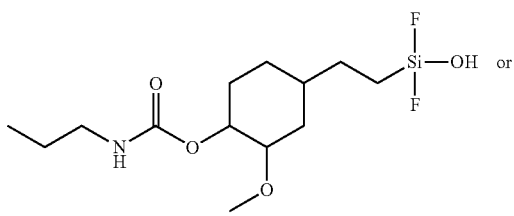

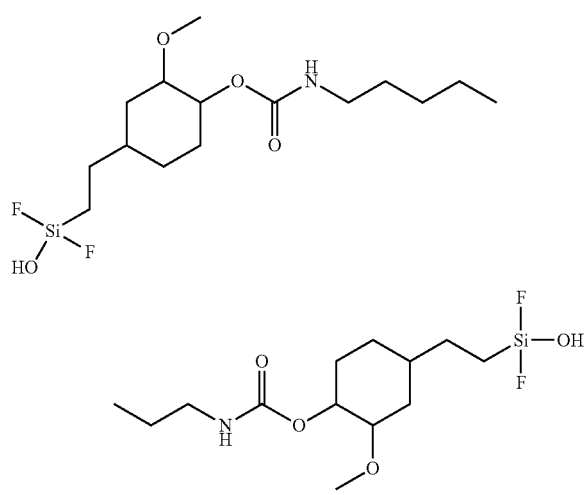

2. The shell-shaped dental appliance of claim 1, wherein the thickness of the anti-caries film is less than 25 μm.

3. The shell-shaped dental appliance of claim 1, wherein the body is made of a polymer material.

4. The shell-shaped dental appliance of claim 1, wherein the fluorine-containing substance is able to be hydrolyzed to release fluoride ions.

5. The shell-shaped dental appliance of claim 1, wherein the weight content of fluorine in the anti-caries film is 600-11200 ppm.

6. A method for fabricating a shell-shaped dental appliance, comprising:
   obtaining a body of a shell-shaped dental appliance which body is an integral shell and forms a cavity for receiving teeth; and
   forming an anti-caries film on at least a partial area of an inner surface of the body, the anti-caries film is able to react with saliva to release fluoride ions;
   wherein the anti-caries film contains a film-forming agent and a fluorine-containing substance, the film-forming agent is aromatic isocyanate, wherein the fluorine-containing substance is a fluorine-containing organosilane whose structural formula is

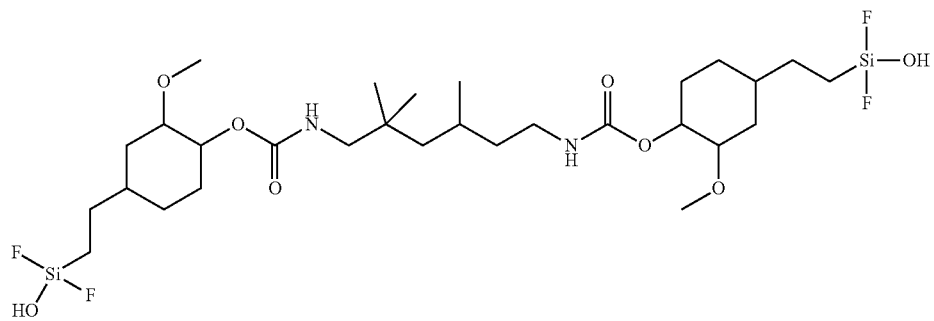 [SMILES: COC1CC(CC[Si](O)(F)F)CCC1OC(=O)NCCC(C)CC(C)(C)CNC(=O)OC1CCC(CC[Si](O)(F)F)CC1OC]

7. The method of claim 6, wherein the method further comprises:
   applying an anti-caries solution on at least a partial area of the inner surface of the body; and
   allowing the anti-caries solution applied on the inner surface of the body to cure to form the anti-caries film.

8. The method of claim 7, wherein an amount of the coated anti-caries solution is controlled such that a thickness of the anti-caries film is less than 25 μm.

9. The method of claim 7, wherein the anti-caries solution contains an organic solvent, a film-forming agent, and a fluorine-containing substance.

10. The method of claim 9, wherein the organic solvent in the anti-caries solution applied on the inner surface of the body is gradually volatilized, so that the content of the organic solvent in the anti-caries film is close to zero.

11. The method of claim 9, wherein the content of the fluorine-containing substance in the anti-caries solution is such that a weight content of fluorine in the anti-caries film is 600-11200 ppm.

12. The method of claim 7, wherein the anti-caries solution comprises:
   1% fluorine-containing organosilane with a fluorine content of 0.1%; 11% aromatic isocyanate film-forming agent; 62.9% ethyl acetate and 25% isoamyl propionate; and 0.1% coolant;
   or
   1% fluorine-containing organosilane with a fluorine content 0.1%; 11% aromatic isocyanate; 87.9% butyl acetate; and 0.1% lemon essence.

* * * * *